(12) United States Patent
Wu (10) Patent No.: US 11,168,678 B2
(45) Date of Patent: Nov. 9, 2021

(54) INFLATION PUMP (71) Applicant: Scott Wu, Taichung (TW)

(72) Inventor: Scott Wu, Taichung (TW)

( * ) Notice: Subject to any disclaimer, the term of this patent is extended or adjusted under 35 U.S.C. 154(b) by 69 days.

(21) Appl. No.: 16/809,834

(22) Filed: Mar. 5, 2020

(65) Prior Publication Data
US 2021/0277878 A1   Sep. 9, 2021

(51) Int. Cl.
*F16K 15/20* (2006.01)
*F04B 33/00* (2006.01)
*B60S 5/04* (2006.01)

(52) U.S. Cl.
CPC ............ *F04B 33/005* (2013.01); *F16K 15/20* (2013.01); *B60S 5/04* (2013.01); *Y10T 137/3724* (2015.04)

(58) Field of Classification Search
CPC ...... F04B 33/005; F04B 33/00; F04B 39/123; F04B 39/125; B60S 5/04; F16K 15/20; Y10T 137/3584; Y10T 137/3724; B60C 29/06; B60C 29/062; B60C 29/064
USPC ........ 137/232, 231; 417/374, 553, 510, 569, 417/460–469, 481–484, 486–488
See application file for complete search history.

(56) References Cited

U.S. PATENT DOCUMENTS

| | | | | |
|---|---|---|---|---|
| 1,784,822 A * | 12/1930 | Crowley | ................. | F16K 31/58 251/149.6 |
| 5,819,781 A * | 10/1998 | Wu | ...................... | F04B 33/005 137/231 |
| 5,975,109 A * | 11/1999 | Wu | .......................... | B60S 5/04 137/223 |
| 6,105,600 A * | 8/2000 | Wang | ....................... | B60S 5/04 137/231 |
| 6,146,116 A * | 11/2000 | Wu | ....................... | F04B 33/005 137/223 |
| 6,378,547 B1 * | 4/2002 | van der Blom | ......... | F16L 37/20 137/224 |
| 6,786,247 B1 * | 9/2004 | Kemppainen | ......... | F04B 33/005 137/223 |
| 7,866,335 B2 * | 1/2011 | Wang | ..................... | F16K 15/20 137/231 |

(Continued)

FOREIGN PATENT DOCUMENTS

TW   I472682 B   2/2015

*Primary Examiner* — Craig J Price
(74) *Attorney, Agent, or Firm* — Karin L. Williams; Alan D. Kamrath; Mayer & Williams PC (57) ABSTRACT

An inflation pump including a body having a cylinder and a head integrally formed with the cylinder. The cylinder includes a pressurizing space. The head includes a through-hole extending along a longitudinal axis. An intercommunication passage is disposed between and intercommunicates with the through-hole and the pressurizing space. A pressurizing unit is slidably received in the pressurizing space and is reciprocally slidable relative to the body. A nozzle unit includes a pressing device disposed in the through-hole. The pressing device includes a push seat having a check ring. The check ring includes an inner side abutting against the push seat and an outer side abutting against a portion of an inner periphery of the through-hole. The portion of the inner periphery of the through-hole is located between the intercommunication passage and the coupling end. The check ring permits air to flow only from the intercommunication passage towards the coupling end.

18 Claims, 7 Drawing Sheets (56) References Cited

U.S. PATENT DOCUMENTS

| | | | | |
|---|---|---|---|---|
| 8,720,475 B2* | 5/2014 | Wu | ............... | F04B 33/00 |
| | | | | 137/231 |
| 8,839,809 B1* | 9/2014 | Wang | ............... | F04B 33/005 |
| | | | | 137/223 |
| 9,057,364 B2* | 6/2015 | Gerritsen | ............... | F04B 33/005 |
| 9,587,753 B2* | 3/2017 | Wang | ............... | B60C 25/18 |
| 9,702,471 B1* | 7/2017 | Wang | ............... | F04B 39/126 |
| 9,989,179 B2* | 6/2018 | Wang | ............... | F04B 33/00 |
| 9,989,180 B2* | 6/2018 | Wang | ............... | F04B 33/00 |
| 10,247,319 B1* | 4/2019 | Wang | ............... | F16K 15/20 |
| 10,369,851 B2* | 8/2019 | Wu | ............... | F04B 33/00 |
| 10,815,981 B2* | 10/2020 | Wu | ............... | F04B 39/14 |
| 2002/0074039 A1* | 6/2002 | Blom | ............... | F16K 15/20 |
| | | | | 137/223 |
| 2008/0308158 A1* | 12/2008 | Wu | ............... | F04B 33/005 |
| | | | | 137/231 |
| 2010/0028180 A1* | 2/2010 | Gerritsen | ............... | F04B 33/005 |
| | | | | 417/556 |
| 2015/0337976 A1* | 11/2015 | Wang | ............... | F16K 15/207 |
| | | | | 137/224 |
| 2017/0276278 A1* | 9/2017 | Wang | ............... | F16L 37/18 |

* cited by examiner

INFLATION PUMP

BACKGROUND OF THE INVENTION

The present invention relates to an inflation pump and, more particularly, to an inflation pump of a simple structure.

Taiwan Patent No. 1472682 discloses a mini inflation pump including a head, a cylinder, a handle, and a fixing device. A nozzle is disposed on a first end of the head, and the cylinder is disposed on a second end of the head. The handle is mounted around the cylinder. A piston rod is mounted in a first end of the handle and is movable relative to the cylinder for pumping air. The fixing device includes a coupling end and a covering end. The coupling end is disposed on a second end of the handle. The covering end selectively covers the nozzle. When the covering end covers the nozzle, the handle and the head are secured together. When the covering end is disengaged from the nozzle, the nozzle can receive an object to be inflated while permitting the handle to displace reciprocally relative the cylinder.

However, to prevent air from flowing in the reverse direction, the above inflation pump requires a one-way valve mounted to an end of the cylinder adjacent to the head. The one-way valve must be in threading connection with the head to mount the one-way valve between the head and the cylinder. Accurate, tight coupling between the one-way valve and the head as well as the cylinder has to be assured. Furthermore, due to requirement of the tight coupling between the head and the cylinder, the inflation pump would leak if the processing precision is insufficient, resulting in difficulties in assembly.

Thus, a need exists for an inflation pump of a simple structure that mitigates and/or obviates the above disadvantages.

BRIEF SUMMARY OF THE INVENTION

An objective of the present invention is to provide an inflation pump including a body having a cylinder and a head connected to and integrally formed with the cylinder. The head is connected to an end of the cylinder. The cylinder includes a pressurizing space therein. The head includes a through-hole extending along a longitudinal axis. An intercommunication passage is disposed between and intercommunicates with the through-hole and the pressurizing space. The head includes an operating end and a coupling end opposite to the operating end along the longitudinal axis. A junction between the intercommunication passage and the through-hole is located between the operating end and the coupling end. A pressurizing unit has an end slidably received in the pressurizing space and reciprocally slidable relative to the body. A nozzle unit includes a pressing device disposed in the through-hole. The pressing device includes a push seat having a check ring. The check ring includes an inner side abutting against the push seat. The check ring includes an outer side radially outwards of the inner side and abutting against a portion of an inner periphery of the through-hole. The portion of the inner periphery of the through-hole is located between the intercommunication passage and the coupling end. The check ring permits air to flow only from the intercommunication passage towards the coupling end. The check ring includes a first end and a second end spaced from the first end along the longitudinal axis. The first end of the check ring is adjacent to the operating end. The second end of the check ring is adjacent to the coupling end. The push seat is movable relative to the body along the longitudinal axis between a first position and a second position. The junction between the intercommunication passage and the through-hole is located between the first end and the second end of the check ring no matter the push seat is in the first position or the second position.

In an example, the check ring includes an integral structure and has a base and an elastic skirt. The base is disposed on the inner side of the check ring and is located adjacent to the first end of the check ring. The base is annular and always abuts against the push seat. The elastic skirt is disposed on the outer side of the check ring and is located adjacent to the second end of the check ring. The elastic skirt is annular and elastically deformable. The elastic skirt has an inner periphery connected to the base portion and an outer periphery releasably abutting against the portion of an inner periphery of the through-hole that is located between the intercommunication passage and the coupling end and that is adjacent to the intercommunication passage. The elastic skirt includes an outer diameter gradually increasing from an end thereof adjacent to the operating end towards another end thereof adjacent to the coupling end.

In an example, the nozzle unit includes a leakproof ring having an inner periphery abutting against the push seat and an outer periphery abutting against another portion of the through-hole. The another portion of the through-hole is located between the intercommunication passage and the operating end.

In an example, another end of the cylinder opposite to the head includes an opening, and the pressurizing unit is inserted into the pressurizing space via the opening.

In an example, the nozzle unit includes a lever pivotably mounted to the operating end. The pressing device includes an airtight ring. The push seat is adjacent to the operating end. The airtight ring is adjacent to the coupling end. A first end of the push seat abuts against the lever. A second end of the push seat directly abuts against the airtight ring. The airtight ring includes a recessed portion on an outer periphery thereof. The recessed portion faces and is spaced from the inner periphery of the through-hole. The recessed portion surrounds the airtight ring about the longitudinal axis. The push seat includes a receiving hole extending from the second end of the push seat towards but spaced from the first end of the push seat adjacent to the operating end. The push seat includes a first slot extending in a radial direction perpendicular to the longitudinal axis. A first holder extends from an inner perimeter of the first slot.

In an example, the push seat has an integral structure.

In an example, the first holder includes a distal end having a first clamping portion, and the first clamping portion is configured to deform and sway relative to the push seat due to elasticity of the first holder.

In an example, the push seat includes a second slot extending in a radial direction perpendicular to the longitudinal axis. The first slot and the second slot are on opposite sides of the receiving hole and intercommunicate with the receiving hole. A second holder extends from an inner perimeter of the second slot, the second holder includes a distal end having a second clamping portion. The second clamping portion is configured to deform and sway relative to the push seat due to elasticity of the second holder. The first clamping portion and the second clamping portion face each other.

In an example, the pressing device includes a compression spring and a tappet which are received in the receiving hole. A first end of the compression spring abuts against an end wall of the receiving hole. The tappet is received in the receiving hole and is movable relative to the push seat along the longitudinal axis. The first holding portion of the first holder is movable in a direction away from the tappet under action of the elasticity of the first holder. The second holding portion of the second holder is movable in a direction away from the tappet under action of the elasticity of the second holder.

In an example, the lever is pivotable relative to the body between a release position and a holding position. When the lever is in the release position, the push seat moves towards the operating end to the first position, and the first holder and the second holder are away from the tappet. When the lever is in the holding position, the push seat moves towards the coupling end to the second position, and the first holder and the second holder are adjacent to the tappet.

In an example, the tappet includes an engaging flange on an outer periphery thereof. The engaging flange has a maximum width in a radial direction perpendicular to the longitudinal axis, forming a coupling width. A release width is defined between the first holding portion and the second holding portion when the lever is in the release position. The release width is not smaller than the coupling width. A holding width is defined between the first holding portion and the second holding portion when the lever is in the holding position. The holding width is smaller than the coupling width.

In an example, a stub projects from the end wall of the receiving hole of the push seat adjacent to the operating end and extends along the longitudinal axis. The first end of the compression spring is mounted around the stub. The tappet is hollow and is mounted around a second end of the compression spring opposite to the stub.

In an example, the recessed portion is arcuate in a cross section taken along a plane passing through the longitudinal axis.

In an example, the recessed portion has a central axis coincident with the longitudinal axis.

In an example, the through-hole has circular cross sections, the receiving hole has circular cross sections, and the end wall delimiting an end of the receiving hole adjacent to the operating end is a closed wall.

In an example, the through-hole of the head includes a shoulder dividing the through-hole into two sections. One of the two sections of the through-hole adjacent to the coupling hole has an inner diameter smaller than an inner diameter of another of the two sections of the through-hole adjacent to the operating end.

In an example, the shoulder has an inner diameter gradually reduces from a side thereof adjacent to the operating end towards another side thereof adjacent to the coupling end, forming a conic surface.

In an example, the nozzle unit includes a cap coupled to the coupling end, and an end of the airtight ring opposite to the push seat abuts against the cap.

The present invention will become clearer in light of the following detailed description of illustrative embodiments of this invention described in connection with the drawings.

DETAILED DESCRIPTION OF THE INVENTION

With reference to FIGS. 1-5, an inflation pump 10 of an embodiment according to the present invention includes a body 20, a pressuring unit 30, and a nozzle unit 40. The body 20 includes a cylinder 21 and a head 22 connected to and integrally formed with the cylinder 21. The head 22 is connected to an end of the cylinder 21. The cylinder 21 includes a pressurizing space 23 therein. Another end of the cylinder 21 opposite to the head 22 includes an opening 24. The head 22 includes a through-hole 25 extending along a longitudinal axis L and having circular cross sections. An intercommunication passage 26 is disposed between the through-hole 25 and the pressurizing space 23 and intercommunicates the through-hole 25 with the pressurizing space 23.

The head 22 includes an operating end 27 and a coupling end 28 opposite to the operating end 27 along the longitudinal axis L. A junction between the intercommunication passage 26 and the through-hole 25 is located between the operating end 27 and the coupling end 28. The through-hole 25 of the head 22 includes a shoulder 29 dividing the through-hole 25 into two sections. One of the two sections of the through-hole 25 adjacent to the coupling hole 28 has an inner diameter smaller than an inner diameter of another of the two sections of the through-hole 25 adjacent to the operating end 27. The shoulder 29 has an inner diameter gradually reduces from a side thereof adjacent to the operating end 27 towards another side thereof adjacent to the coupling end 28, forming a conic surface.

The pressurizing unit 30 is inserted into the pressurizing space 23 via the opening 24. The pressurizing unit 30 includes an end slidably received in the pressurizing space 23 and reciprocally slidable relative to the body 20.

The nozzle unit 40 includes a lever 41, a cap 42, and a pressing device 43. The lever 41 is pivotably mounted to the operating end 27 and is pivotable relative to the body 20 between a release position and a holding position. The cap 42 is coupled to the coupling end 28.

The pressing device 43 is disposed in the through-hole 25 and includes a push seat 44 adjacent to the operating end 27 and an airtight ring 45 adjacent to the coupling end 28. A first end of the push seat 44 abuts against the lever 41. A second end of the push seat 44 directly abuts against the airtight ring 45. An end of the airtight ring 45 opposite to the push seat 44 abuts against the cap 42. The airtight ring 45 includes a recessed portion 451 on an outer periphery thereof. The recessed portion 451 faces and is spaced from the inner periphery of the through-hole 25. The recessed portion 451 surrounds the airtight ring 45 about the longitudinal axis L. The recessed portion 451 is arcuate in a cross section taken along a plane passing through the longitudinal axis L. The recessed portion 451 has a central axis coincident with the longitudinal axis L.

The push seat 44 includes a check ring 441 and a leakproof ring 442. The check ring 441 includes an inner side abutting against the push seat 44. The check ring 441 includes an outer side radially outwards of the inner side and abutting against a portion of an inner periphery of the through-hole 25. The portion of the inner periphery of the through-hole 25 is located between the intercommunication passage 26 and the coupling end 28. The check ring 441 permits air to flow only from the intercommunication passage 26 towards the coupling end 28. The leakproof ring 442 has an inner periphery abutting against the push seat 44 and an outer periphery abutting against another portion of the through-hole 25. The another portion of the through-hole 25 is located between the intercommunication passage 26 and the operating end 27.

The check ring 441 includes a first end 443 and a second end 444 spaced from the first end 443 along the longitudinal axis L. The first end 443 of the check ring 441 is adjacent to the operating end 27. The second end 444 of the check ring 441 is adjacent to the coupling end 28.

The check ring 441 includes an integral structure and has a base 445 and an elastic skirt 446. The base 445 is disposed on the inner side of the check ring 441 and is located adjacent to the first end 443 of the check ring 441. The base 445 is annular and always abuts against the push seat 44. The elastic skirt 446 is disposed on the outer side of the check ring 441 and is located adjacent to the second end 444 of the check ring 441. The elastic skirt 446 is annular and elastically deformable. The elastic skirt 446 has an inner periphery connected to the base portion 445 and an outer periphery releasably abutting against the portion of an inner periphery of the through-hole 25 that is located between the intercommunication passage 26 and the coupling end 28 and is adjacent to the intercommunication passage 26. The elastic skirt 446 includes an outer diameter gradually increasing from an end thereof adjacent to the operating end 27 towards another end thereof adjacent to the coupling end 28.

The push seat 44 includes an integral structure. The push seat 44 includes a receiving hole 447 extending from the second end of the push seat 44 towards but spaced from the first end of the push seat 44 adjacent to the operating end 27. The receiving hole 447 has circular cross sections. An end wall delimiting an end of the receiving hole 447 adjacent to the operating end 27 is a closed wall. A stub 448 projects from the end wall of the receiving hole 447 of the push seat 44 adjacent to the operating end 27 and extends along the longitudinal axis L.

The push seat 44 includes a first slot 46 and a second slot 47. Both the first slot 46 and the second slot 47 extend in a radial direction perpendicular to the longitudinal axis L. The first slot 46 and the second slot 47 are on opposite sides of the receiving hole 447 and intercommunicate with the receiving hole 447.

A first holder 461 extends from an inner perimeter of the first slot 46. The first holder 461 includes a distal end having a first clamping portion 462. The first clamping portion 462 is configured to deform and sway relative to the push seat 44 due to elasticity of the first holder 461.

A second holder 471 extends from an inner perimeter of the second slot 47. The second holder 471 includes a distal end having a second clamping portion 472. The second clamping portion 472 is configured to deform and sway relative to the push seat 44 due to elasticity of the second holder 471. The first clamping portion 462 and the second clamping portion 472 face each other.

The pressing device 43 includes a compression spring 48 and a tappet 49 which are received in the receiving hole 447. A first end of the compression spring 48 abuts against the end wall of the receiving hole 447 and is mounted around the stub 448. The tappet 49 is hollow and is mounted around a second end of the compression spring 48 opposite to the stub 448. The tappet 49 is received in the receiving hole 447 and is movable relative to the push seat 44 along the longitudinal axis L. The first holding portion 462 of the first holder 461 is movable in a direction away from the tappet 49 under action of the elasticity of the first holder 461. The second holding portion 472 of the second holder 471 is movable in a direction away from the tappet 49 under action of the elasticity of the second holder 471. The tappet 49 includes an engaging flange 491 on an outer periphery thereof. The engaging flange 491 has a maximum width in a radial direction perpendicular to the longitudinal axis L, forming a coupling width WL.

Figure 1:
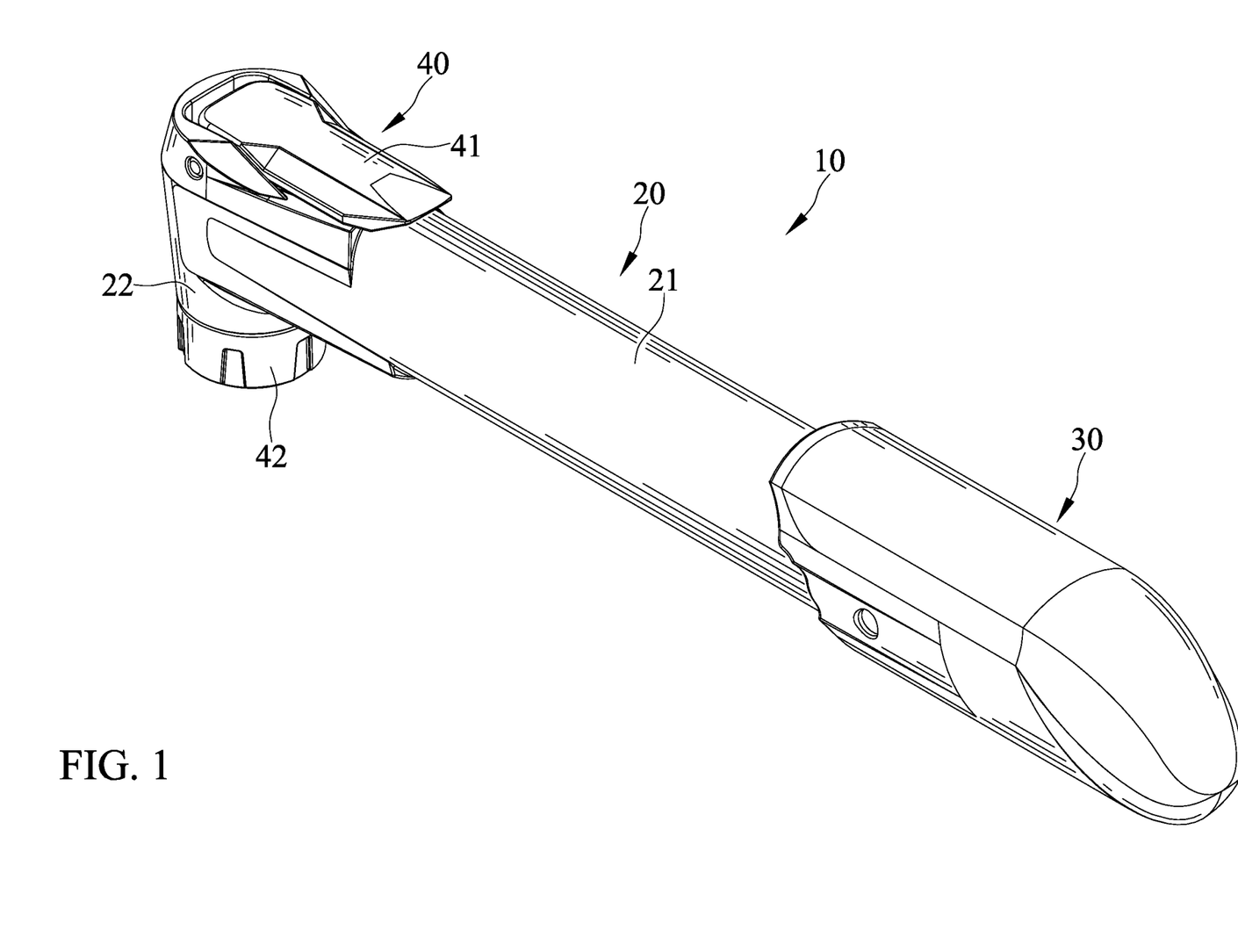
FIG. 1 is a perspective view of an inflation pump of an embodiment according to the present invention.
Figure 2:
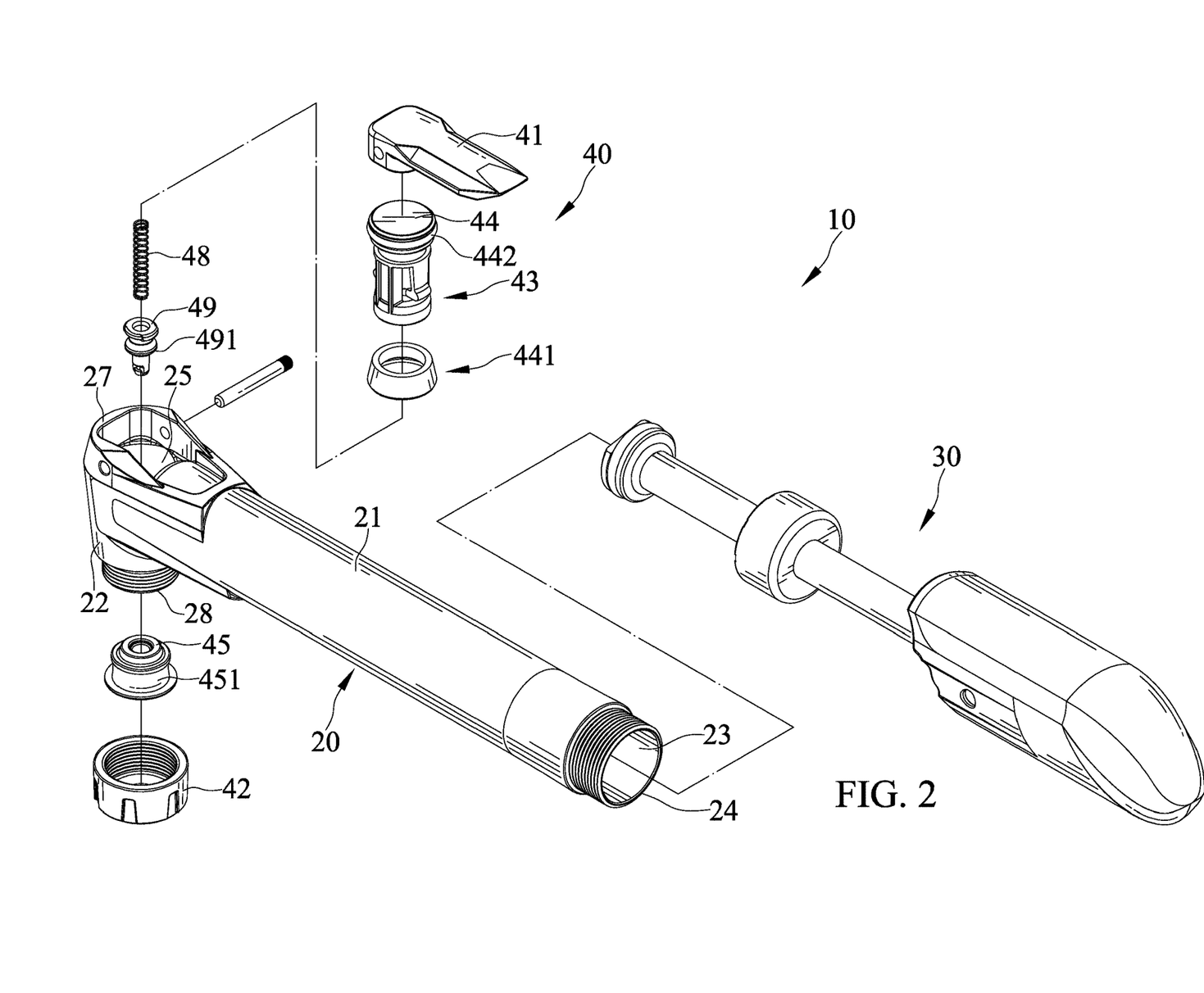
FIG. 2 is an exploded, perspective view of the inflation pump of FIG. 1.
Figure 3:
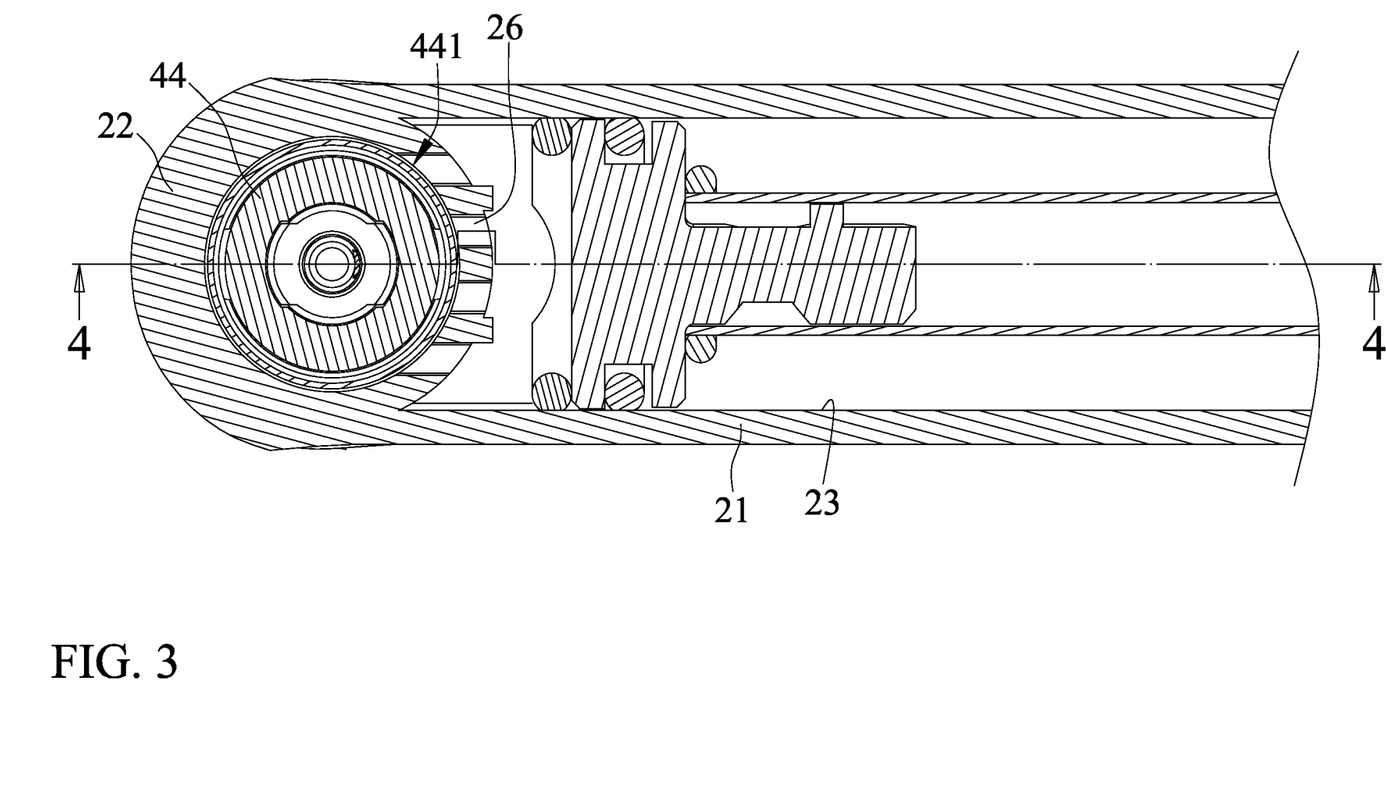
FIG. 3 is a partial, cross sectional view of the inflation pump of FIG. 1.
Figure 4:
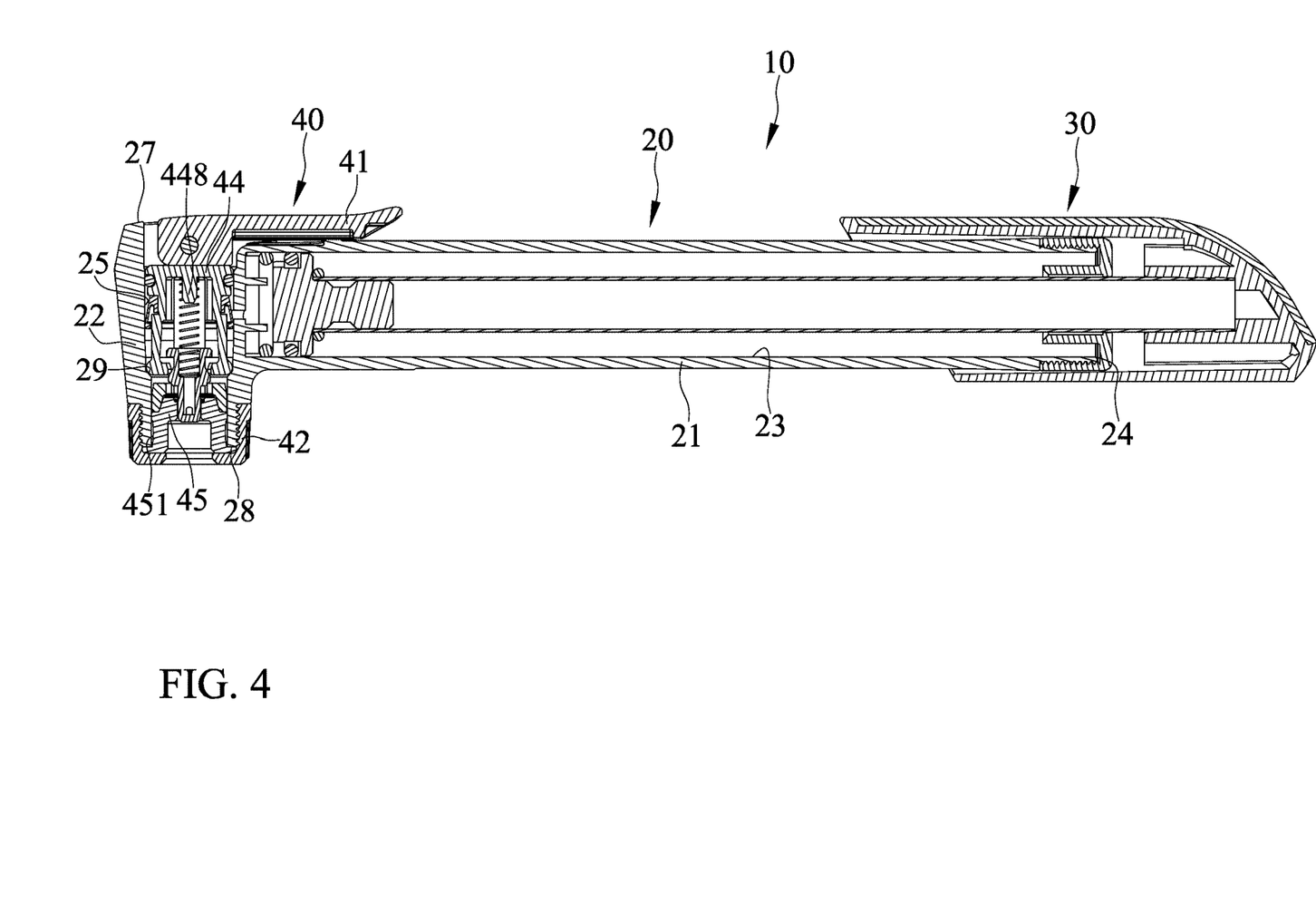
FIG. 4 is a cross sectional view taken along section line 4-4 of FIG. 3.
Figure 5:
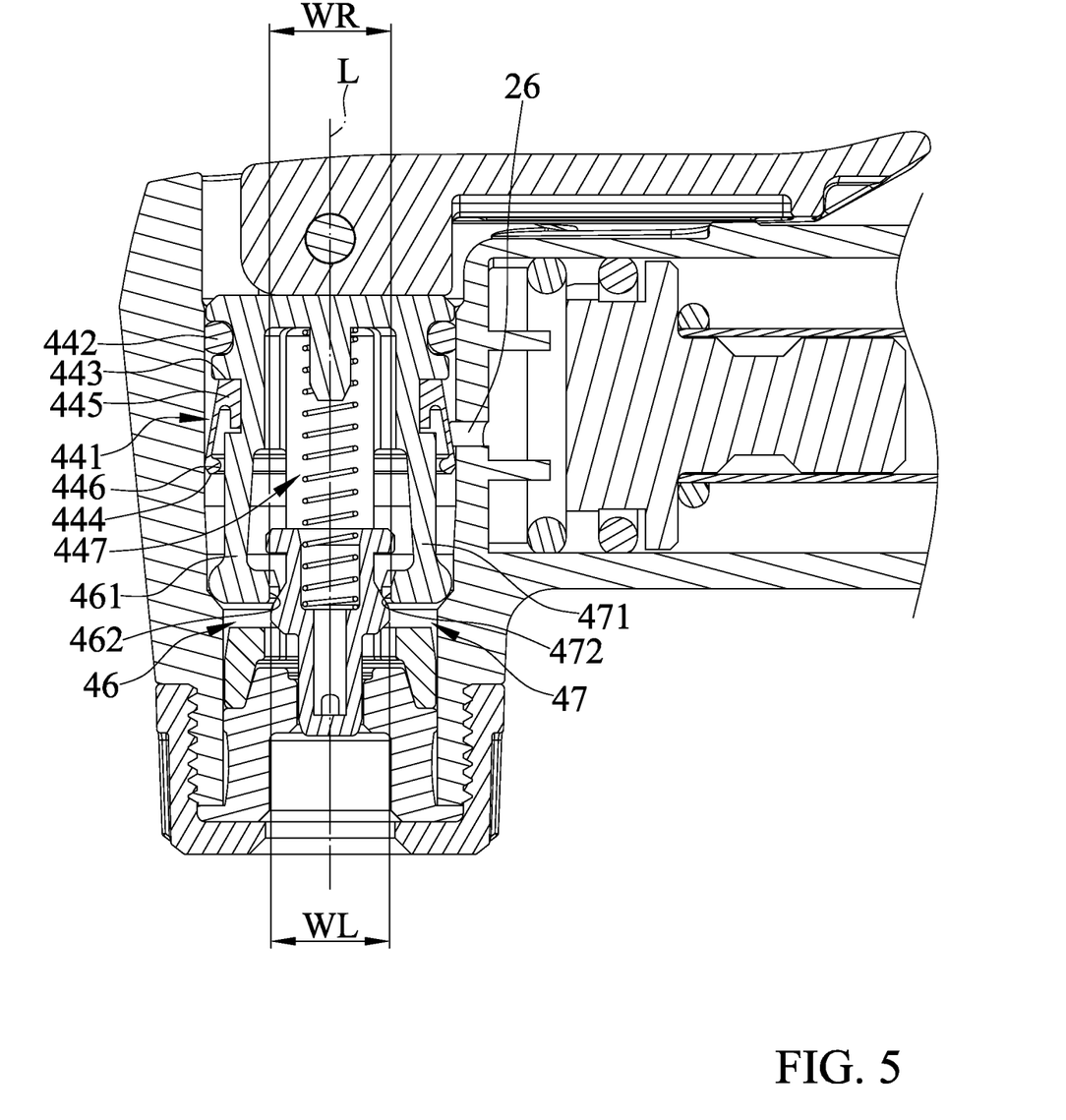
FIG. 5 is an enlarged view of a portion of FIG. 4.
Figure 6:
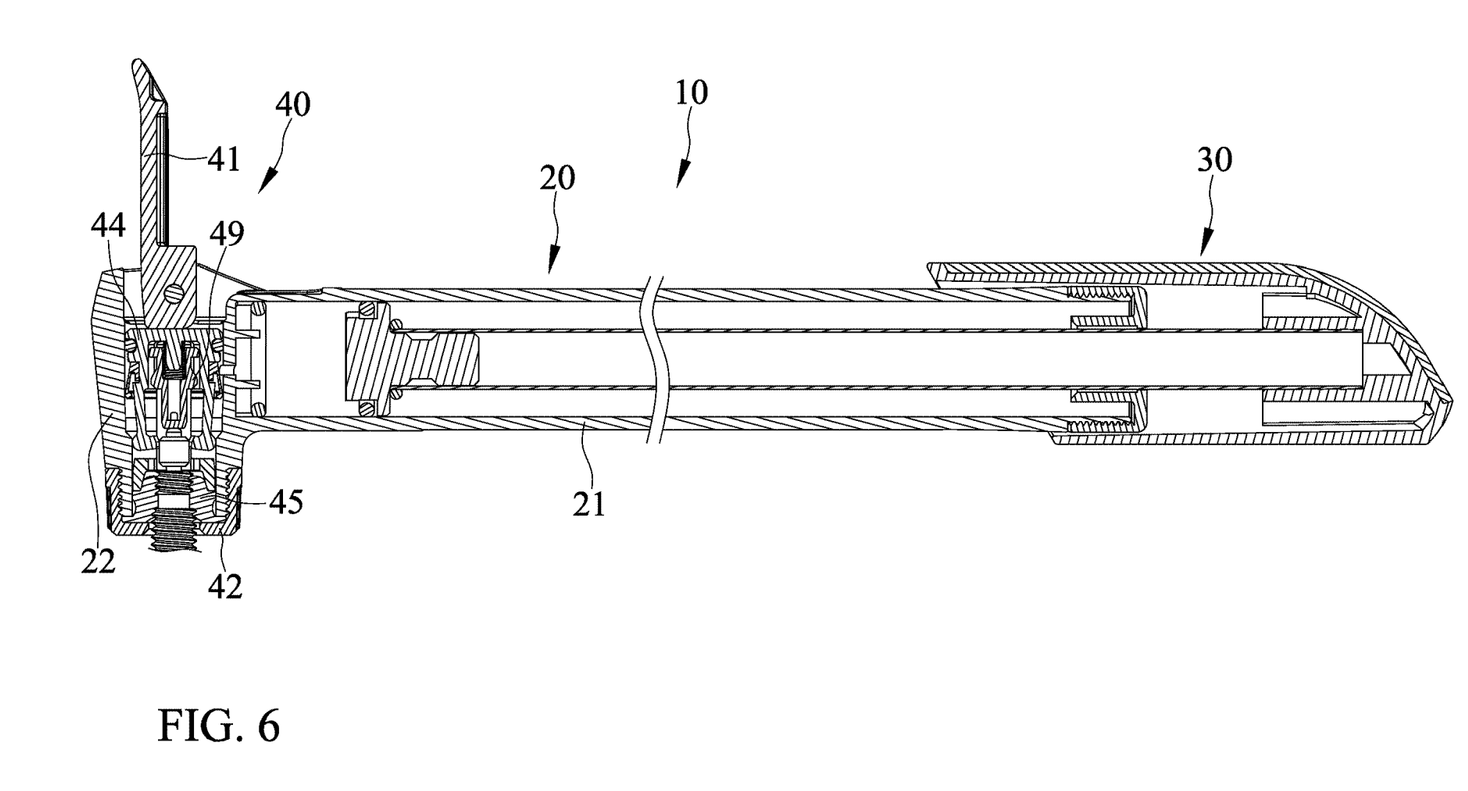
FIG. 6 is a cross sectional view of the inflation pump of FIG. 1 with the inflation pump coupled with a French valve and with a lever pivoted to a holding position.
Figure 7:
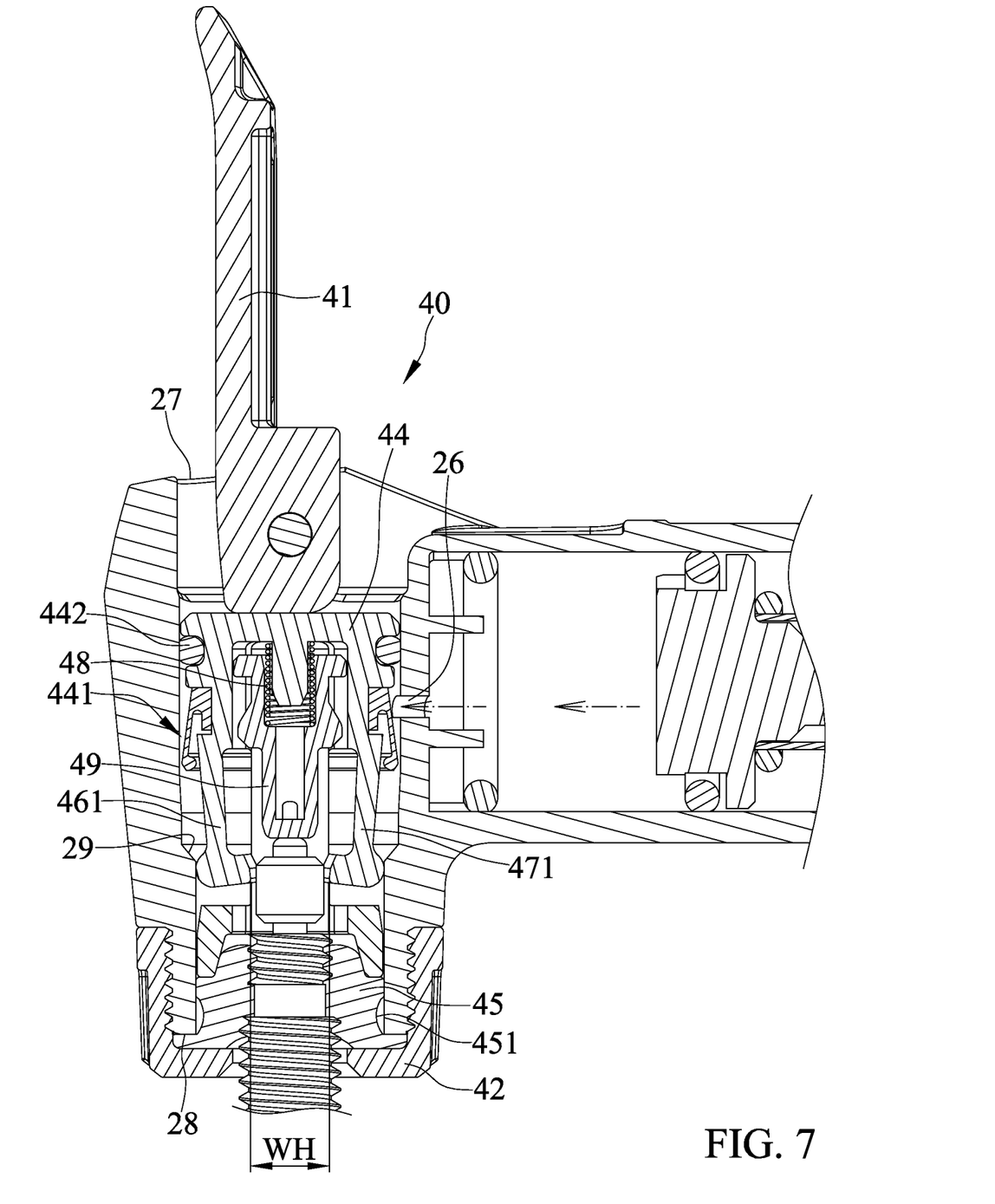
FIG. 7 is an enlarged view of a portion of FIG. 6.

With reference to FIGS. 6 and 7, the push seat 44 is movable relative to the body 20 along the longitudinal axis L between a first position and a second position. When the lever 41 is in the release position, the push seat 44 moves towards the operating end 27 to the first position, and the first holder 461 and the second holder 471 are away from the tappet 49. A release width WR is defined between the first holding portion 462 and the second holding portion 472 when the lever 41 is in the release position. The release width WR is not smaller than the coupling width WL. When the lever 41 is in the holding position, the push seat 44 moves towards the coupling end 48 to the second position, and the first holder 461 and the second holder 471 are adjacent to the tappet 49. A holding width WH is defined between the first holding portion 462 and the second holding portion 472 when the lever 41 is in the holding position. The holding width WH is smaller than the coupling width WL. The junction between the intercommunication passage 26 and the through-hole 25 is located between the first end 443 and the second end 444 of the check ring 441 no matter that the push seat 44 is in the first position or the second position.

By providing the body 20 of an integral structure, the inflation pump 10 can effectively avoid leakage resulting from poor sealing due to dimensional imprecision. Furthermore, the inflation pump 10 is effectively simplified in structure to permit easy, rapid assembly.

When the inflation pump 10 is used to couple with a French valve, the French valve is inserted into the pressing device 43 and pushes the tappet 49 while compressing the compression spring 48. Then, the lever 41 is pivoted to the holding position, which, in turn, moves the push seat 44 and squeezes the airtight ring 45 to deform, such that the airtight ring 45 tightly abuts against an outer surface of the French valve, forming an airtight state while avoiding disengagement of the French valve during inflation.

Due to provision of the recessed portion 451 on the outer periphery of the airtight ring 45, when the airtight ring 45 is squeezed by the push seat 44, the airtight ring 45 will deform towards the longitudinal axis L. Due to the increased deformation in the radial direction perpendicular to the longitudinal axis L, the airtight condition between the deformed airtight ring 45 and the valve is increased to avoid leakage. Furthermore, the airtight ring 45 can withstand a long, squeezing travel of the push seat 44. Furthermore, the recessed portion 451 serves as a space for the deformed airtight ring 45 squeezed by the push seat 44, such that the push seat 44 can easily push the airtight ring 45 to deform. After the push seat 44 squeezes the airtight ring 45 to deform, the airtight ring 45 provides a uniform, stable returning force for returning the seat 44 to its original position.

When the inflation pump 10 is used to couple with an American valve, the airtight ring 45 tightly abuts against an outer surface of the American valve to provide an airtight state, and the first clamping portion 462 and the second clamping portion 472 abut against a side of the coupling flange 491 opposite to the airtight ring 45, avoiding the tappet 49 from being pushed rearwards. Thus, the tappet 49 can reliably open a check valve of the American valve.

By providing the inflation pump 10 having the push seat 44 of an integral structure, when the lever 41 is lifted to the holding position and pushes the push seat 44, the push seat 44 can directly squeeze and deform the airtight ring 45 that has a good deforming effect achieving an excellent airtight effect. Furthermore, the number of parts of the inflation pump 10 is reduced to reduce the costs, and the gaps resulting from part tolerances are also reduced. Thus, the inflation pump 10 operates precisely and reliably.

No matter that the push seat 44 is in the first position or the second position, the intercommunication passage 26 is located between the first end 443 and the second end 444 of the check ring 441, such that an outlet of the intercommunication passage 26 is aligned with the check ring 441. During inflation, the temperature of air in the pressurizing space 23 increases due to rubbing against the inner periphery of the body 20 or compression. The push seat 44 is made of plastic material. When the high-pressure air after an increase in the temperature directly contacts with the push seat 44, deterioration and damage of the push seat 44 are accelerated. The check ring 441 is made of rubber material which is more resistant to heat than the push seat 44. By providing the above structure, damage to the push seat 44 resulting from high temperature can be avoided. Furthermore, the check ring 441 is easy to replace and is inexpensive.

Although specific embodiments have been illustrated and described, numerous modifications and variations are still possible without departing from the scope of the invention. The scope of the invention is limited by the accompanying claims.

The invention claimed is:

1. An inflation pump comprising:
   a body including a cylinder and a head connected to and integrally formed with the cylinder, wherein the head is connected to an end of the cylinder, wherein the cylinder includes a pressurizing space therein, wherein the head includes a through-hole extending along a longitudinal axis, wherein an intercommunication passage is disposed between and intercommunicates with the through-hole and the pressurizing space, wherein the head includes an operating end and a coupling end opposite to the operating end along the longitudinal axis, wherein a junction between the intercommunication passage and the through-hole is located between the operating end and the coupling end;
   a pressurizing unit having an end slidably received in the pressurizing space and reciprocally slidable relative to the body; and
   a nozzle unit including a pressing device disposed in the through-hole, wherein the pressing device includes a push seat having a check ring, wherein the check ring includes an inner side abutting against the push seat, wherein the check ring includes an outer side radially outwards of the inner side and abutting against a portion of an inner periphery of the through-hole, wherein the portion of the inner periphery of the through-hole is located between the intercommunication passage and the coupling end, wherein the check ring permits air to flow only from the intercommunication passage towards the coupling end, wherein the check ring includes a first end and a second end spaced from the first end along the longitudinal axis, wherein the first end of the check ring is adjacent to the operating end, wherein the second end of the check ring is adjacent to the coupling end, wherein the push seat is movable relative to the body along the longitudinal axis between a first position and a second position, wherein the junction between the intercommunication passage and the through-hole is located between the first end and the second end of the check ring no matter that the push seat is in the first position or the second position.

2. The inflation pump as claimed in claim 1, wherein the check ring includes an integral structure and has a base and an elastic skirt, wherein the base is disposed on the inner side of the check ring and is located adjacent to the first end of the check ring, wherein the base is annular and always abuts against the push seat, wherein the elastic skirt is disposed on the outer side of the check ring and is located adjacent to the second end of the check ring, wherein the elastic skirt is annular and elastically deformable, wherein the elastic skirt has an inner periphery connected to the base portion and an outer periphery releasably abutting against the portion of the inner periphery of the through-hole that is located between the intercommunication passage and the coupling end and that is adjacent to the intercommunication passage, wherein the elastic skirt includes an outer diameter gradually increasing from an end thereof adjacent to the operating end towards another end thereof adjacent to the coupling end.

3. The inflation pump as claimed in claim 1, wherein the nozzle unit includes a leakproof ring having an inner periphery abutting against the push seat and an outer periphery abutting against another portion of the through-hole, and wherein the another portion of the through-hole is located between the intercommunication passage and the operating end.

4. The inflation pump as claimed in claim 1, wherein another end of the cylinder opposite to the head includes an opening, and wherein the pressurizing unit is inserted into the pressurizing space via the opening.

5. The inflation pump as claimed in claim 1, wherein the nozzle unit includes a lever pivotably mounted to the operating end, wherein the pressing device includes an airtight ring, wherein the push seat is adjacent to the operating end, wherein the airtight ring is adjacent to the coupling end, wherein a first end of the push seat abuts against the lever, wherein a second end of the push seat directly abuts against the airtight ring, wherein the airtight ring includes a recessed portion on an outer periphery thereof, wherein the recessed portion faces and is spaced from the inner periphery of the through-hole, wherein the recessed portion surrounds the airtight ring about the longitudinal axis, wherein the push seat includes a receiving hole extending from the second end of the push seat towards but spaced from the first end of the push seat adjacent to the operating end, wherein the push seat includes a first slot extending in a radial direction perpendicular to the longitudinal axis, and wherein a first holder extends from an inner perimeter of the first slot.

6. The inflation pump as claimed in claim 5, wherein the push seat has an integral structure.

7. The inflation pump as claimed in claim 5, wherein the first holder includes a distal end having a first clamping portion, and wherein the first clamping portion is configured to deform and sway relative to the push seat due to elasticity of the first holder.

8. The inflation pump as claimed in claim 7, wherein the push seat includes a second slot extending in a radial direction perpendicular to the longitudinal axis, wherein the first slot and the second slot are on opposite sides of the receiving hole and intercommunicate with the receiving hole, wherein a second holder extends from an inner perimeter of the second slot, the second holder includes a distal end having a second clamping portion, wherein the second clamping portion is configured to deform and sway relative to the push seat due to elasticity of the second holder, and wherein the first clamping portion and the second clamping portion face each other.

9. The inflation pump as claimed in claim 8, wherein the pressing device includes a compression spring and a tappet which are received in the receiving hole, wherein a first end of the compression spring abuts against an end wall of the receiving hole, wherein the tappet is received in the receiving hole and is movable relative to the push seat along the longitudinal axis, wherein the first holding portion of the first holder is movable in a direction away from the tappet under action of the elasticity of the first holder, and wherein the second holding portion of the second holder is movable in a direction away from the tappet under action of the elasticity of the second holder.

10. The inflation pump as claimed in claim 9, wherein the lever is pivotable relative to the body between a release position and a holding position, wherein when the lever is in the release position, the push seat moves towards the operating end to the first position, and the first holder and the second holder are away from the tappet, and wherein when the lever is in the holding position, the push seat moves towards the coupling end to the second position, and the first holder and the second holder are adjacent to the tappet.

11. The inflation pump as claimed in claim 10, wherein the tappet includes an engaging flange on an outer periphery thereof, wherein the engaging flange has a maximum width in a radial direction perpendicular to the longitudinal axis, forming a coupling width, wherein a release width is defined between the first holding portion and the second holding portion when the lever is in the release position, wherein the release width is not smaller than the coupling width, wherein a holding width is defined between the first holding portion and the second holding portion when the lever is in the holding position, and wherein the holding width is smaller than the coupling width.

12. The inflation pump as claimed in claim 9, wherein a stub projects from the end wall of the receiving hole of the push seat adjacent to the operating end and extends along the longitudinal axis, wherein the first end of the compression spring is mounted around the stub, and wherein the tappet is hollow and is mounted around a second end of the compression spring opposite to the stub.

13. The inflation pump as claimed in claim 12, wherein the recessed portion is arcuate in a cross section taken along a plane passing through the longitudinal axis.

14. The inflation pump as claimed in claim 13, wherein the recessed portion has a central axis coincident with the longitudinal axis.

15. The inflation pump as claimed in claim 12, wherein the through-hole has circular cross sections, wherein the receiving hole has circular cross sections, and wherein the end wall delimiting an end of the receiving hole adjacent to the operating end is a closed wall.

16. The inflation pump as claimed in claim 12, wherein the through-hole of the head includes a shoulder dividing the through-hole into two sections, and wherein one of the two sections of the through-hole adjacent to the coupling hole has an inner diameter smaller than an inner diameter of another of the two sections of the through-hole adjacent to the operating end.

17. The inflation pump as claimed in claim 16, wherein the shoulder has an inner diameter gradually reduces from a side thereof adjacent to the operating end towards another side thereof adjacent to the coupling end, forming a conic surface.

18. The inflation pump as claimed in claim 12, wherein the nozzle unit includes a cap coupled to the coupling end, and wherein an end of the airtight ring opposite to the push seat abuts against the cap.

\* \* \* \* \*